Oct. 30, 1923.
C. W. BROOKS
1,472,544
BOLL WEEVIL EXTERMINATOR
Filed May 9, 1923
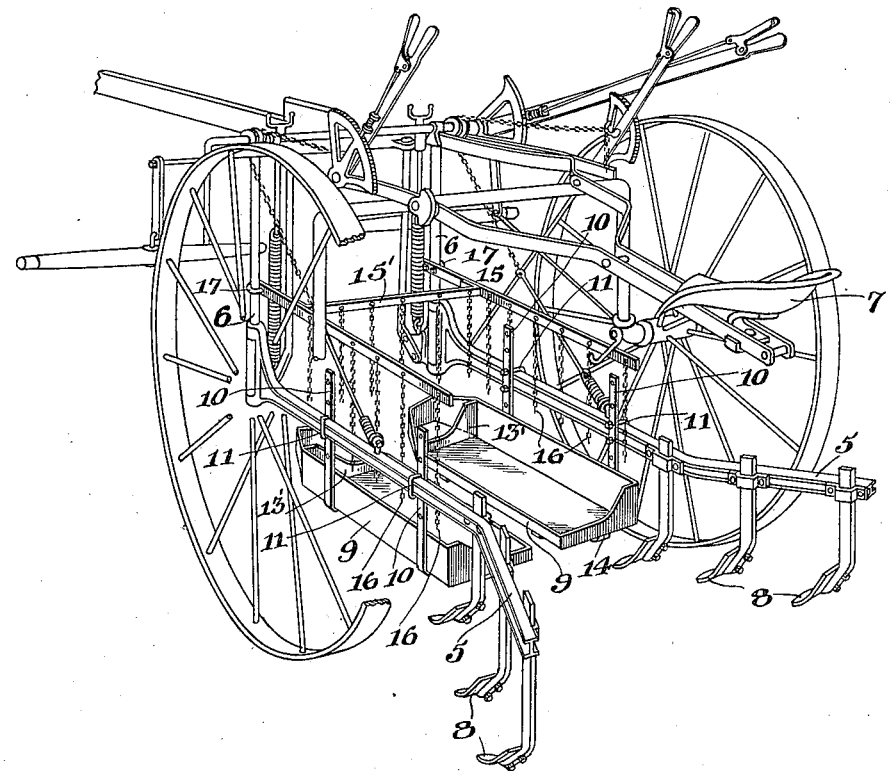
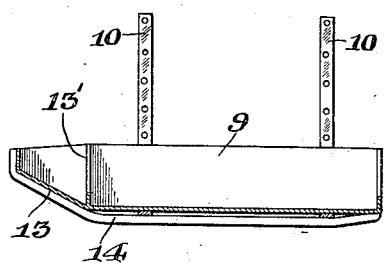
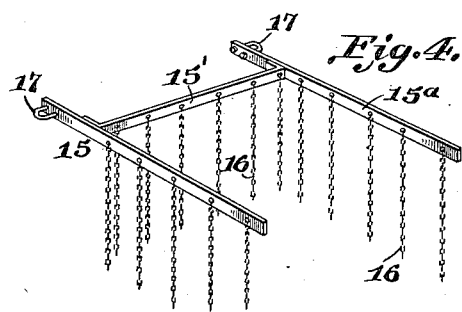
Inventor
Charles W. Brooks
By Mason Fenwick & Lawrence
Attorneys Patented Oct. 30, 1923.

1,472,544

UNITED STATES PATENT OFFICE.

CHARLES W. BROOKS, OF HUNTSVILLE, ALABAMA, ASSIGNOR OF ONE-HALF TO ANNA W. COBB, OF HUNTSVILLE, ALABAMA.

BOLL-WEEVIL EXTERMINATOR.

Application filed May 9, 1923. Serial No. 637,772.

*To all whom it may concern:*

Be it known that I, CHARLES W. BROOKS, a citizen of the United States, residing at Huntsville, in the county of Madison and State of Alabama, have invented certain new and useful Improvements in Boll-Weevil Exterminators; and I do hereby declare the following to be a full, clear, and exact description of the invention, such as will enable others skilled in the art to which it appertains to make and use the same.

This invention relates to a boll weevil exterminator and has for its object to provide a machine for dislodging the weevils from the cotton plants while the ground is being cultivated. The invention has been embodied with a cultivator implement of a type adapted to straddle a row of cotton plants.

The invention is in the nature of an attachment which consists of a frame from which depends a plurality of chains which are adapted to brush against the plants as the implement is drawn along with the idea of dislodging the weevils and collecting them in pans disposed on either side of the plant.

The various features of novelty and invention will appear from the detailed description of the invention taken in connection with the accompanying drawings forming part of this specification.

Fig. 1 is a perspective view of a well known form of agricultural implement showing the invention in place therein.

Fig. 2 is a perspective view of one of the pans in which the dislodged weevils are collected.

Fig. 3 is a longitudinal extension taken through the pan.

Fig. 4 is a perspective view showing the frame from which the weevil dislodging chains are depended.

The agricultural implement is preferably a cultivator of any preferred type. In the drawings the implement is shown as provided with two rearwardly extending plow bars 5, the same being mounted for swinging movement about a vertically disposed post 6.

The implement has an operator's seat 7 from which the plow bars or beams 5 may be controlled as to certain movement by the feet of the operator.

The plow beams 5 carry suitable plows 8 for cultivating the soil between the rows of cotton. The other constructional features of the agricultural implement need not be specifically referred to.

As already indicated the agricultural implement is designed to straddle a row of cotton in such a manner that the plow beams will be disposed on either side of the row. Attached to each plow beam is a pan 9 which is supported on L-shaped members 10, which may be secured to the plow beams by U-shaped clips 11. The members 10 are provided with a plurality of holes so that the height of the pans can be adjusted with respect to the ground. It is contemplated that the pans shall be suspended from the beams so as to be disposed above the plows 8 so that when the latter are entered into the earth the pans will clear the ground.

The front end of each pan is beveled away from the side which will be disposed against the cotton row so as to constitute a guide or gate into which the plants may enter for passing between the adjacent sides of the pans. This beveled part is indicated at 12 and the said ends are also preferably upwardly directed as at 13 to constitute a runner-like end so that the pans may easily ride over obstructions should the same be encountered in the course of travel. There is also provided a runner-like member 14 which extends from the front of the pans to the rear thereof, this member serving to protect the bottom of the pan should the same encounter obstructions. The front of the pan is provided with a brace 13′ which extends transversely of the pan as clearly shown in the drawings. The pans are made tight so as to hold liquid into which the weevils will be received as they are dislodged from the plants.

The means for dislodging the weevils from the plants preferably takes the form of an H-like member 15 of sufficient length to extend substantially the length of the pans. The transverse member of this H-like frame has a row of depending chains 16 and this row of chains is disposed near the front end of the pans. The side members of this frame are also provided with similar chains and all the chains are fairly heavy so as to impart a strong brushing or sweeping action through the plants. The H-like frame at its forward end is provided with openings for the reception of U-clips 17 which serve to connect the frame to a fixed part of the agricultural implement, as for example, the downwardly extending members 6 to which the plow beams 5 are connected. It is to be understood, however, that the chain carrying frame may be connected to any suitable part of the implement, the main consideration being that it shall be disposed in such a manner that the transverse row of chains shall extend across the front of the pans.

The operation of the machine will be clear. As the implement passes down a row of cotton the plants will be directed between the pans 9 and will be readily received therebetween by reason of the outwardly flaring ends of the pans, the entrance to the opening between the pans being very much in the nature of a funnel-like gate. The transversely extending chains on the bar 15' will thoroughly shake up the plants and the longitudinally extending chains on the side arms 15ª of the frame will sweep through the plants with the result that any weevils on the plants will be dislodged therefrom and will fall into the pans at the sides thereof. The pans will preferably contain poisonous fluid in which the weevils will perish.

What is claimed is:

Combination with an agricultural implement having an arched axle and a pair of rearwardly directed plow beams in spaced relation, an H-shaped frame extending between said arch, and connected at its forward end to a fixed part of the implement, the cross portion and the rearwardly extending portions of the said frame having chains depending therefrom, a pan adjustably mounted on each of said plow beams adjacent the lower ends of said chains, said pans being spaced apart and having their forward ends outwardly flared whereby to define a channel thru which cotton plants may pass.

In testimony whereof I affix my signature.

CHARLES W. BROOKS.